United States Patent
Claflin

(10) Patent No.: US 9,046,058 B2
(45) Date of Patent: Jun. 2, 2015

(54) SYSTEM AND METHOD OF COMBUSTION FOR SUSTAINING A CONTINUOUS DETONATION WAVE WITH TRANSIENT PLASMA

(75) Inventor: Scott Claflin, Owens Cross Roads, AL (US)

(73) Assignee: AEROJET ROCKETDYNE OF DE, INC., Canoga Park, CA (US)

( * ) Notice: Subject to any disclaimer, the term of this patent is extended or adjusted under 35 U.S.C. 154(b) by 603 days.

(21) Appl. No.: 13/392,149

(22) PCT Filed: Dec. 18, 2009

(86) PCT No.: PCT/US2009/068630
§ 371 (c)(1),
(2), (4) Date: Feb. 24, 2012

(87) PCT Pub. No.: WO2011/037597
PCT Pub. Date: Mar. 31, 2011

(65) Prior Publication Data
US 2012/0151898 A1  Jun. 21, 2012

Related U.S. Application Data

(60) Provisional application No. 61/245,034, filed on Sep. 23, 2009.

(51) Int. Cl.
*F02C 5/00* (2006.01)
*F02K 9/66* (2006.01)
*F02C 3/14* (2006.01)
*F02K 7/04* (2006.01)
(Continued)

(52) U.S. Cl.
CPC ... *F02K 9/66* (2013.01); *F02C 3/14* (2013.01); *F02K 7/04* (2013.01); *F05D 2270/172* (2013.01); *F23R 7/00* (2013.01); *H05H 1/52* (2013.01); *F05D 2250/25* (2013.01)

(58) Field of Classification Search
CPC ................ F23R 7/00; F02C 5/00; F02C 5/02; F02K 7/02; F02K 7/06
USPC ...................... 60/247, 39.38, 39.76
See application file for complete search history.

(56) References Cited

U.S. PATENT DOCUMENTS 3,336,754 A  8/1967 Lange et al.
3,954,380 A  5/1976 Valaev et al.
(Continued)

FOREIGN PATENT DOCUMENTS

JP  2008261621  10/2008

OTHER PUBLICATIONS

Japanese Office Action dated Jun. 4, 2013 for Japanese Patent Application No. 2012-530855.
(Continued)

*Primary Examiner* — Gerald L Sung
(74) *Attorney, Agent, or Firm* — Joel G Landau

(57) ABSTRACT

An annular combustion (22) chamber and a transient plasma system (42) in communication with the annular combustion chamber (22) to sustain a spinning detonation wave. This system (42) is also called as "nanosecond pulsed plasma" system and a pulse generator (48) operates to generate by energy but intense high voltage pulses to provide tansient plasma (p); increasing the reactivity of the chemical species of the popelllants. The propulsion relies on constant pressure combustion (CDWE).

3 Claims, 1 Drawing Sheet

(51) Int. Cl.
*F23R 7/00* (2006.01)
*H05H 1/52* (2006.01)

(56) References Cited

U.S. PATENT DOCUMENTS

| | | | |
|---|---|---|---|
| 4,097,820 A | 6/1978 | Hill et al. | |
| 4,215,635 A | 8/1980 | Farace | |
| 4,365,471 A * | 12/1982 | Adams | 60/39.76 |
| 4,932,306 A | 6/1990 | Rom | |
| 5,019,686 A | 5/1991 | Marantz | |
| 5,187,319 A | 2/1993 | Nouguez et al. | |
| 5,206,059 A | 4/1993 | Marantz | |
| 5,262,206 A | 11/1993 | Rangaswamy et al. | |
| 5,540,155 A | 7/1996 | Hill | |
| 5,596,165 A | 1/1997 | Carney | |
| 5,702,769 A | 12/1997 | Peters | |
| 6,001,426 A | 12/1999 | Witherspoon et al. | |
| 6,124,563 A | 9/2000 | Witherspoon et al. | |
| 6,152,010 A | 11/2000 | Mixon et al. | |
| 6,442,930 B1 | 9/2002 | Johnson et al. | |
| 6,550,235 B2 | 4/2003 | Johnson et al. | |
| 6,666,018 B2 | 12/2003 | Butler et al. | |
| 6,725,646 B2 | 4/2004 | Callas et al. | |
| 6,964,171 B2 | 11/2005 | Li et al. | |
| 7,449,068 B2 | 11/2008 | Lichtblau | |
| 8,082,728 B2 * | 12/2011 | Murrow et al. | 60/247 |
| 2002/0197885 A1 | 12/2002 | Hwang et al. | |
| 2003/0008342 A1 | 1/2003 | Scholler et al. | |
| 2003/0029160 A1 | 2/2003 | Johnson et al. | |
| 2003/0066337 A1 | 4/2003 | Gauthier, Jr. et al. | |
| 2003/0131584 A1 | 7/2003 | Butler et al. | |
| 2003/0147812 A1 | 8/2003 | Ueberle | |
| 2003/0173900 A1 | 9/2003 | Inan et al. | |
| 2003/0178075 A1 | 9/2003 | Moon et al. | |
| 2003/0192311 A1 | 10/2003 | Callas et al. | |
| 2003/0209198 A1 | 11/2003 | Shabalin et al. | |
| 2004/0219161 A1 | 11/2004 | Scholler et al. | |
| 2004/0262901 A1 | 12/2004 | Brewster et al. | |
| 2005/0058957 A1 | 3/2005 | Li et al. | |
| 2005/0079461 A1 | 4/2005 | Kasahara | |
| 2005/0184669 A1 | 8/2005 | Chistyakov | |
| 2005/0187581 A1 | 8/2005 | Hara et al. | |
| 2005/0284127 A1 * | 12/2005 | Tobita et al. | 60/39.34 |
| 2006/0062928 A1 | 3/2006 | Lichtblau | |
| 2006/0175197 A1 | 8/2006 | Chistyakov | |
| 2006/0279223 A1 | 12/2006 | Chistyakov | |
| 2007/0068242 A1 | 3/2007 | DiFoggio | |
| 2007/0113781 A1 | 5/2007 | Lichtblau | |
| 2007/0114901 A1 | 5/2007 | Nagasawa et al. | |
| 2007/0119827 A1 | 5/2007 | Miller et al. | |
| 2007/0137172 A1 * | 6/2007 | Rasheed et al. | 60/39.76 |
| 2007/0151254 A1 * | 7/2007 | Gupta et al. | 60/776 |
| 2007/0184554 A1 | 8/2007 | Teuscher et al. | |
| 2007/0188104 A1 | 8/2007 | Chistyakov et al. | |
| 2008/0141954 A1 | 6/2008 | Norris et al. | |
| 2008/0277006 A1 | 11/2008 | Moon et al. | |
| 2008/0302652 A1 | 12/2008 | Entley et al. | |
| 2008/0311612 A1 | 12/2008 | Lu et al. | |
| 2009/0020227 A1 | 1/2009 | Andou et al. | |
| 2009/0073442 A1 | 3/2009 | Smith | |
| 2009/0134130 A1 | 5/2009 | Lang et al. | |
| 2009/0158748 A1 | 6/2009 | Nordeen | |
| 2009/0193786 A1 | 8/2009 | Murrow et al. | |
| 2009/0231583 A1 | 9/2009 | Smith | |

OTHER PUBLICATIONS

International Preliminary Report on Patentability, dated Apr. 5, 2012, PCT/US2009/068630.
Wang F et al, Transient plasma ignition of hydrocarbon-air mixtures in pulse detonation engines, Jan. 1, 2004, AIAA Aerospace Sciences Meeting/AIAA Thermophysics Conference.
Bykovskii F A et al, "Realization and modeling of continuous spin detonation of a hydrogen-oxygen mixture in flow-type combustors. 1. Combustors of cylindrical annular geometry" Combustion, Explosion, and Shock Waves, Kluwer Academic Publishers—Plenum Publishers NE, Nov. 11, 2009.
PCT International Search Report, PCT/US2009/068630, dated Oct. 4, 2010.
Starikovskii, A Y et al, "Nanosecond-Pulsed Discharges for Plasma-Assisted Combustion and Aerodynamics," Journal of Propulsion and Power, vol. 24, No. 6, Nov.-Dec. 2008.
Bykovskii, F.A. et al. "Continuous Spin Detonation of Hydrogen-Oxygen Mixtures, 1. Annular Cylindrical Combustors," Combustion, Explosion, and Shock Waves, vol. 44, No. 2, pp. 150-162, 2008.
Falempin, F., "Continuous Detonation Wave Engine," Advances in Propulsion Technology for High-Speed Aircraft, RTO-EN-AVT-150, pp. 8-1 to 8-16.

* cited by examiner

SYSTEM AND METHOD OF COMBUSTION FOR SUSTAINING A CONTINUOUS DETONATION WAVE WITH TRANSIENT PLASMA

The present disclosure claims priority to U.S. Provisional Patent Application No. 61/245,034, filed Sep. 23, 2009.

BACKGROUND

The present disclosure relates to a Continuous Detonation Wave Engine, and more particularly to sustainment of a spinning detonation wave thereof.

Continuous Detonation Wave Engines generate a spinning detonation wave in an annular combustion chamber. Sustainment of the spinning detonation wave may be difficult as numerous factors will tend to damp and dissipate the spinning detonation wave.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
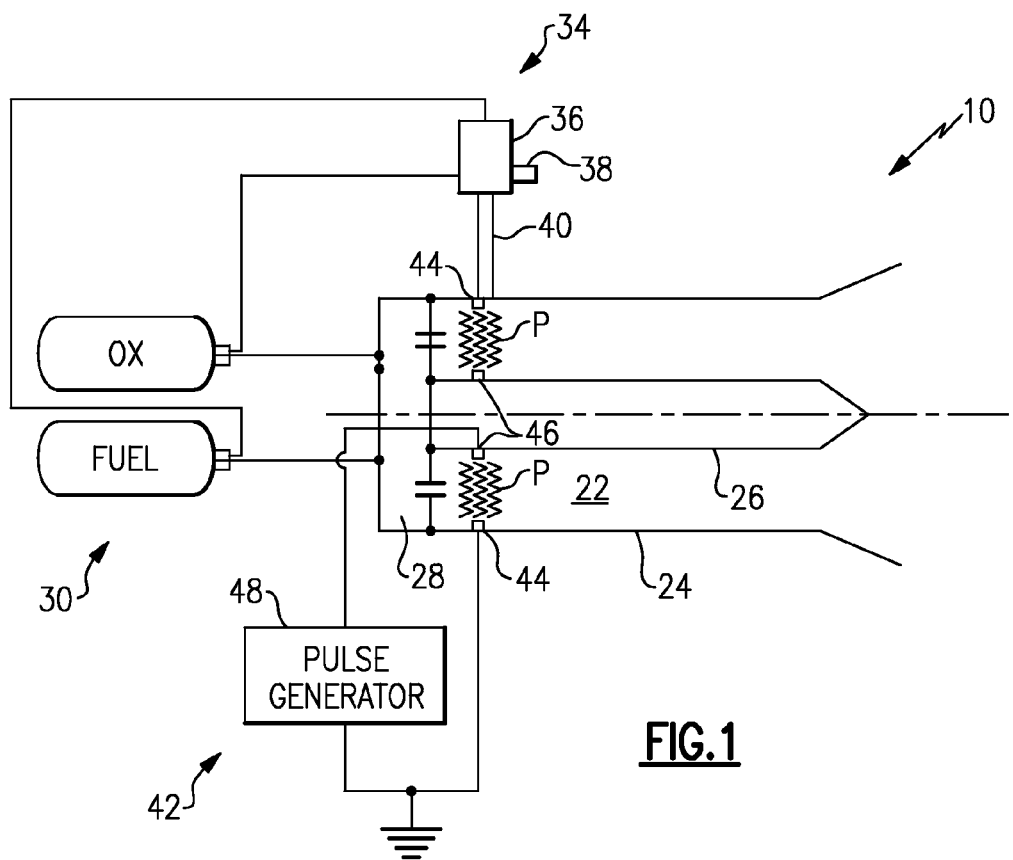
FIG. 1 is a general schematic view of a Continuous Detonation Wave Engine.

FIG. 1 schematically illustrates a Continuous Detonation Wave Engine (CDWE) 20. The CDWE 20 provides a compact and efficient system which enables relatively low feed pressure and high combustion efficiency. CDWEs provide for high energy utilization.

The CDWE 20 generally includes an annular combustion chamber 22 defined by an outer wall structure 24 and an inner wall structure 26. The annular combustion chamber 22 is closed on one end section by an injector system 28 which communicates with a propellant system 30 which supplies propellants such as a fuel and an oxidizer which form a reacting mixture. The reacting mixture is created by intimately mixing the propellants by the injector system 28. One injector system 28 may have a geometry selected based on the degree of mixing. For example, the geometry of the injector system 28 may include impinging jets, swirl elements, premixing chamber and other features that provide for intimate mixing of the propellants. In one non-limiting embodiment the fuel includes Ethylene and the oxidizer includes oxygen. The annular combustion chamber 22 is open opposite the injector system 28 to define a nozzle 32.

An initiation system 34 is utilized to ignite the spinning detonation wave. In one embodiment, an initiation system 34 may include a mixing chamber 36, a spark plug 38 and a tangential detonation tube 40. In another embodiment not shown herein, the initiation system 34 may use devices to ignite combustion including a pyrotechnic ignitor, a glow plug, hypergols, and pyrophoric fluids and others in lieu of or in addition to the spark plug 38. In another embodiment, the initiation system 34 may include detonation cord, exploding wires, and/or a local ignition system disposed proximate the injector.

Referring again to FIG. 1, a relatively small amount of propellants are premixed in the mixing chamber 36, the spark plug 38 lights off the propellants, then the burning mixture (deflagration) transitions to a detonation wave within the tangential detonation tube 40. The tangential detonation tube 40 injects the detonation wave tangentially into the annular combustion chamber 22 to initiate the spinning detonation wave. It should be understood that alternate or additional components may be utilized with the initiation system. Once the process is started, no additional ignition energy is typically required and the initiation system 34 may be shut down.

Figure 2:
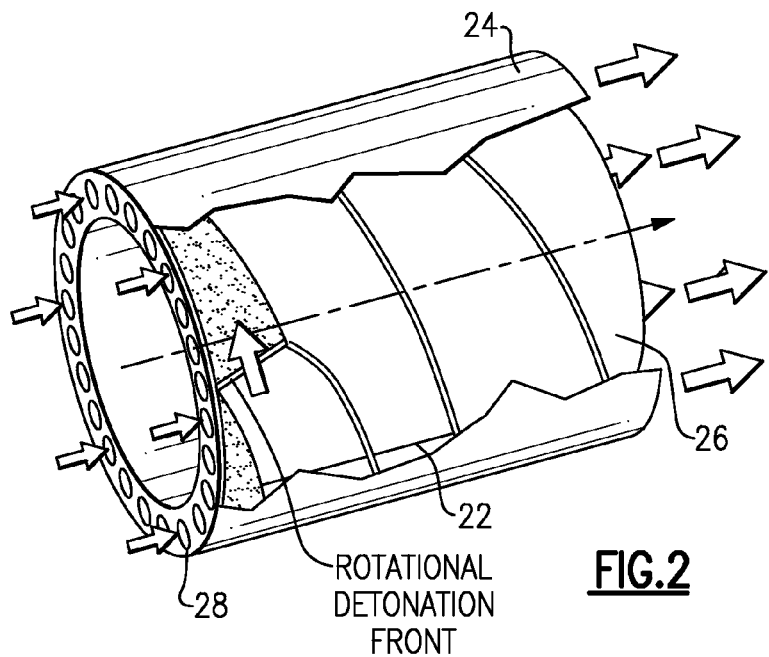
FIG. 2 is a general schematic view of a Continuous Detonation Wave Engine illustrating a spinning detonation wave.

The propellants burn to form at least one transversal or spinning detonation wave that propagates normally in an azimuthal direction from the axially injected propellants within the annular combustion chamber 22 as generally understood (FIG. 2). The spinning detonation wave propagates along the rotating detonation front and burns a shock-compressed mixture. The spinning detonation wave within the annular combustion chamber 22 provide for increased chemical energy utilization relative to conventional constant pressure combustion.

The CDWE 20, due in part to the more efficient thermodynamic properties, exhibits a higher level of performance than more conventional propulsion system that rely on constant-pressure combustion processes. Sustainment of the spinning detonation wave may be relatively difficult and sensitive to the operational environment. Numerous factors tend to damp and dissipate the spinning detonation wave to include poorly mixed propellants, unreacted propellants, improper injection velocities, chemical kinetics, wall heat transfer, boundary layer build-up, etc.

A transient plasma system 42, also known as a nanosecond pulsed plasma system, is located within the CDWE 20 to sustain the spinning detonation wave. The transient plasma system 42 includes a cathode 44 in the outer wall structure 24 and an anode 46 in the inner wall structure 26 or vice-versa such that electrical potential is disposed between the outer wall structure 24 and the inner wall structure 26 within the annular combustion chamber 22. A pulse generator 48 operates to generate low energy but intense, high voltage pulses to provide transient plasma P, wherein electrons at high velocity travel through the annular combustion chamber 22. In one example, the pulse is 20 nsec at 10-100 kV.

The transient plasma P causes high velocity electrons and streamers to be created. The high velocity electrons and streamers produce radicals, ions and a high proportion of vibrationally excited chemical species which thereby increase reaction rates. The transient plasma P also greatly increase the reactivity of chemical species, via radical formation and ionization, and thus minimize the damping effect of chemical kinetics on the spinning detonation wave. The increase in chemical reaction rates augments and sustains the detonation process.

Arc discharge is prevented based on the very rapid pulsing of the voltage field. In this regard, there is substantially precluded loss of velocity with the electrons. This configuration enables the CDWE 20 to be insensitive to design and operating environment variables and thereby perform with increased energy release as compared to constant pressure configured engines. In one example, the transient plasma system 42 enables engines and burners with an approximate 37% increase in energy utilization over conventional constant pressure engine and burners. This translates into an approximately 17% increase in specific impulse for reaction propulsion systems.

Furthermore, in air-breathing applications, the transient plasma system 42 will facilitate sustainment of the spinning detonation wave without the requirement of supplemental oxygen.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A system for sustaining a continuous detonation wave comprising:

a combustion chamber, wherein the combustion chamber is an annular combustion chamber, wherein said annular combustion chamber is at least partially defined by an outer wall structure and an inner wall structure;

an injector having a geometry selected for intimately mixing at least two propellants; and a transient plasma system disposed relative to the combustion chamber, wherein said transient plasma system includes an anode in one of said outer wall structure and said inner wall structure and a cathode in the other of said outer wall structure and said inner wall structure.

2. A method of combustion comprising:

sustaining a spinning detonation wave by generating low energy high voltage pulses within an annular combustion chamber with a transient plasma system;

initiating the spinning detonation wave with an initiation system; and shutting down the initiation system once the spinning detonation wave has been initiated.

3. The method as recited in claim 2, further comprising: continuously generating said low energy high voltage pulses throughout operation.

* * * * *